UNITED STATES PATENT OFFICE.

CHARLES A. DIEHL, OF CLEVELAND, OHIO.

METHOD OF CHLORIDIZING ORES.

938,044. Specification of Letters Patent. Patented Oct. 26, 1909.

No Drawing. Application filed June 29, 1906. Serial No. 323,986.

*To all whom it may concern:*

Be it known that I, CHARLES A. DIEHL, a citizen of the United States of America, residing at Cleveland, in the county Cuyahoga and State of Ohio, have invented certain new and useful Improvements in Methods of Chloridizing Ores; and I hereby declare the following to be a full, clear, and exact description of the invention, such as will enable others skilled in the art to which it pertains to make and use the same.

This invention relates to a method of treating ores for converting the metallic values thereof into chlorids. This has been accomplished heretofore by means of chlorin or hydrochloric acid, either method being inefficient in some cases.

I find that I can obtain better results by subjecting the pulverized ores in any suitable vessel to the action of a chloridizing agent, such as hydrochloric acid, and sulfur dioxid. This may be accomplished by admitting the gases into the vessel containing the ore or by producing them therein during the operation of chloridizing. In the latter case the gases formed are more efficient in their action. If the ore to be treated be free from or deficient in sulfur content, sulfur must be added either in its molecular condition or combined with metals as sulfids. I find that by subjecting ore containing sulfur to the action of chlorin in the presence of moisture the results are that an atmosphere of hydrochloric acid and sulfur dioxid is created. The action in such cases is substantially as follows: The metal is chloridized and a mixture of hydrochloric acid gas and sulfur dioxid is formed by the joint action of chlorin and water on the sulfur. The formation of sulfur chlorid is thereby avoided, and the gases formed react more vigorously than if introduced to the ore from an outside source. The amount of moisture should be limited so as not to form sulfates. If deemed necessary to complete the decomposition of the ore, air or oxygen may be admitted to the container and allowed to react on the sulfur in order to form an additional quantity of sulfur dioxid. I find that the best results are obtained when the mixture of the gases are in the molecular proportions of four of hydrochloric acid to one of sulfur dioxid. This is the ratio that is obtained by the decomposition of sulfur chlorid by water. The term ore is intended to apply to metallurgical products such as ore concentrates or mattes.

I prefer to subject the ore to the reacting gases in a revoluble drum provided with suitable heating means, but I employ any suitable form of apparatus for carrying the method into effect.

To secure the proper working of my process the ore must be at a suitable temperature during the working and this temperature will vary according to the ore which is being treated. In some instances the heat of combination will be sufficient to bring about decomposition of the material and in such cases application of external heat would be unnecessary, and in other cases the heat of combination would not be sufficient to carry out the reaction and it will be necessary therefore to apply external heat.

I claim:—

1. The method of treating sulfid ores which consists in reacting thereon with a gaseous agent consisting essentially of hydrochloric acid and sulfur dioxid and avoiding excess of oxygen, whereby the sulfur of the ore and of the sulfur dioxid is recovered as elemental sulfur, substantially as described.

2. The method of treating sulfur ore which consists in reacting thereon with a gaseous agent consisting essentially of hydrochloric acid and sulfur dioxid in the approximate ratio of four molecular proportions of hydrochloric acid to one molecular proportion of sulfur dioxid, substantially as described.

In testimony whereof, I sign the foregoing specification, in the presence of two witnesses.

CHARLES A. DIEHL.

Witnesses:
VICTOR C. LYNCH,
N. L. MCDONNELL.